(12) United States Patent
Mordukhovich et al.

(10) Patent No.: US 7,686,734 B2
(45) Date of Patent: Mar. 30, 2010

(54) APPARATUS AND METHOD OF USING A HARDNESS DIFFERENTIAL AND SURFACE FINISH ON MATING HARD GEARS

(75) Inventors: Gregory Mordukhovich, Bloomfield Hills, MI (US); Avinash Singh, Sterling Heights, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 472 days.

(21) Appl. No.: 11/673,742

(22) Filed: Feb. 12, 2007

(65) Prior Publication Data

US 2008/0194377 A1    Aug. 14, 2008

(51) Int. Cl.
*F16H 55/06* (2006.01)
*F16H 57/08* (2006.01)

(52) U.S. Cl. .............................. 475/331; 74/460; 74/462

(58) Field of Classification Search ................... 74/457, 74/460, 462; 475/331
See application file for complete search history.

(56) References Cited

U.S. PATENT DOCUMENTS

| | | | | |
|---|---|---|---|---|
| 4,776,224 A | * | 10/1988 | Maezawa et al. | 74/7 E |
| 5,605,518 A | * | 2/1997 | Kogure et al. | 475/344 |
| 5,685,944 A | * | 11/1997 | Nose et al. | 156/540 |
| 5,928,101 A | * | 7/1999 | Hancock | 475/184 |
| 6,732,606 B1 | * | 5/2004 | Zhu et al. | 74/460 |
| 7,309,465 B2 | * | 12/2007 | Fujiki et al. | 419/11 |

* cited by examiner

*Primary Examiner*—Ha D. Ho
(74) *Attorney, Agent, or Firm*—Quinn Law Group, PLLC

(57) ABSTRACT

An apparatus and method for finishing the mating surfaces of a gear set or gear train includes at least a first and a second rotatably connected gear element in dynamic, lubricated contact and rotating at different cycle rates. A hardness differential is employed between mating gear surfaces to balance surface damage imparted by friction and plastic deformation. The mating surfaces are of a hardness of at least approximately 70 on the Rockwell superficial hardness scale (70HR-30N), and are subjected to a polishing process, such as isotropic chemical finishing, to shape the surface asperity profile, thereby reducing accumulative damage due to friction and plastic deformation.

9 Claims, 2 Drawing Sheets

APPARATUS AND METHOD OF USING A HARDNESS DIFFERENTIAL AND SURFACE FINISH ON MATING HARD GEARS

TECHNICAL FIELD

The present invention relates generally to balancing the detrimental effects of deformation on the mating teeth of various hard gears, and more particularly, to an apparatus and method for utilizing a combination of isotropic surface finishing techniques to minimize the height and slope of surface micro-asperities, and a deliberate, predetermined hardness differential to balance plastic deformation of mating hard gear surfaces, thereby extending the overall life of the gear set.

BACKGROUND OF THE INVENTION

Gear sets, or gear trains, are common to all mechanical or electro-mechanical systems requiring rotational motion control and power transmission, from simple machines such as wrist watches or wind-up toys to more complex systems such as automotive transmissions. A gear set consists of several mechanical gear elements, with each gear element engageable with at least one other gear element to transmit power and motion from one rotating body to another. Each gear element rotates or cycles at a cycle rate that may vary substantially from the cycle rates of other interconnected gear elements in the same gear set. The specific gear surface hardness chosen for any given application will depend in large part on the dynamics of the individual gear element and the forces or loads to which the individual gear elements are subjected.

Due to relatively high operating speeds and heavy loading, automotive power transmission gear sets are typically constructed from materials substantially harder than those used in lower speed, lower load gear sets. Gear sets used in automotive transmission systems in particular commonly include planetary gear sets comprised of sun gears, ring gears, and pinion gears.

A typical planetary gear set contains at least one high-cycle gear, for instance a sun gear, engaged or enmeshed with one or more lower-cycle gears such as a plurality of pinion gears. The sun gear typically sees more cycles than the pinion gear. The greater number of stress cycles or revolutions endured by the higher-cycle sun gear element may result in gradual, accumulative damage to the gear surfaces due to plastic deformation and friction, and in particular to those gear surfaces directly engaged with a mating gear element. Damage to the mating gear surfaces may take the form of abrasive wear, pitting, fatigue cracking, or other friction and stress-related deformation. Because of the relatively extreme operating conditions an automotive transmission may be subjected to, mating gear elements within such a system are typically hardened in an attempt to minimize damage inflicted on the gear elements during run-in and subsequent use.

It is known to use case hardening of gear elements in order to strengthen the overall gear set. Common case hardening methods include nitriding, carburizing, or carbon-nitriding processes by which nitrogen or carbon, respectively, are added to the external layers of the gear element to produce the desired surface hardness. In the use of case hardened gear elements, particularly in such gear element variations as are employed in automotive transmissions and other automotive gear systems, the surface hardness of the mating gears is matched as closely as possible within the tolerances of the gear elements, with the overall goal of minimizing damage to the surfaces of mating gears. As higher-cycle gear elements may experience increased levels of fatigue, stress cracking, and pitting relative to the lower-cycle mating gears, the higher-cycle gear may become the weakest member of the gear set, and therefore the primary source of costly premature gear set failure.

It is also known to apply surface coatings or spray coatings as a "hard" layer on mating metal parts. Common hard coatings include chromium, carbide, and titanium compounds. Fatigue performance of applied coatings is a noted drawback of hard coatings, due to the inherent risk of chipping, flaking, or the gradual reduction in bonding strength between the various material layers. Further, hard coatings are relatively expensive to apply, and repeatability of the applications within a narrow tolerance can be difficult and costly. In automotive planetary gear sets, applied hard coatings are commonly reserved for specialty applications, due in large part to these disadvantages.

It is also known to employ a hardness differential, i.e. a variance in surface hardness, between mating "soft" gear elements of a surface hardness of up to 35 on the Rockwell 30N (HR-30N) superficial hardness scale, in certain circular low speed/low stress gear sets. In such soft gear sets, the hardness differential is mainly used to compensate for manufacturing errors, such as errors in central distance and gear geometry, as changes in the shape or profile of the softer member occur through abrasive wear and/or plastic deformation. Such self-forming soft gear applications are typically limited to low speed drives employing circular gears in which the soft mating gears are not subject to the extreme stress, deformation, and accumulative wear of high cycle gears of the planetary gear type used in automotive transmissions.

SUMMARY OF THE INVENTION

The present invention extends the useful life of a gear set by balancing the detrimental, accumulative effects of plastic deformation to the mating surfaces of gear train elements generally, and in hard, high cycle automotive gear elements such as sun gears, ring gears, and pinion gears in particular. Such accumulative effects may appear as damage brought about by direct mechanical stress and friction, and by the resultant plastic and elastic deformation, present between two or more surfaces in dynamic contact. In particular, it is the unique behavior of micro-level asperities of mating hard surfaces in direct contact that necessitate the use or provision of surface hardness selection and surface finishing techniques that go beyond simple surface hardness matching.

More particularly, substantial plastic and elastic deformation occurs as metallic gear elements or gear teeth engage and bring force to bear on opposing members. By carefully defining and controlling the surface hardness and micro-level surface characteristics of mating hard surfaces, such as those of high-cycle automotive gear teeth, the useful life of a gear set is greatly extended, resulting in substantial cost savings and improvements in system reliability and overall quality.

In one aspect of the invention, the life of a gear set is extended by deliberately employing a predetermined hardness differential between mating gear surfaces. In particular, the higher-cycle gears are given a surface hardness exceeding that of the lower-cycle gear elements of the same gear set, thereby allocating a greater proportion of the plastic deformation to the mating gear element with the lower relative cycle rate.

In another aspect of the invention, the mating gear surfaces are further refined or polished to a high level, minimizing the effect of the micro-asperities present on mating surfaces and thereby reducing accumulative damage and losses due to friction and plastic deformation between the contacting solid asperity surfaces.

In another aspect of the invention, refining or polishing of the mating gear surfaces is effectuated by way of isotropic finishing, such as by controlled chemical finishing. Isotropic finishing facilitates the unimpeded flow of lubricant between and around mating gear surfaces in lubricated contact, thereby reducing losses due to fluid friction.

In another aspect of the invention, gear element life is extended by a process or method consisting of refining or polishing the mating surfaces of both gear elements to a fine finish to thereby optimally shape the micro-asperity surface profile to maximize the area of contact, and further selecting or providing a first, lower-cycle gear element of a first surface hardness, selecting or providing a mating higher-cycle gear element of a second predetermined surface hardness higher than that of the first gear element, thereby balancing accumulative damage and minimizing losses due to plastic deformation as well as mechanical and fluid friction.

The above features and advantages, and other features and advantages of the present invention are readily apparent from the following detailed description of the best modes for carrying out the invention when taken in connection with the accompanying drawings.

DESCRIPTION OF THE PREFERRED EMBODIMENT

Figure 1A:
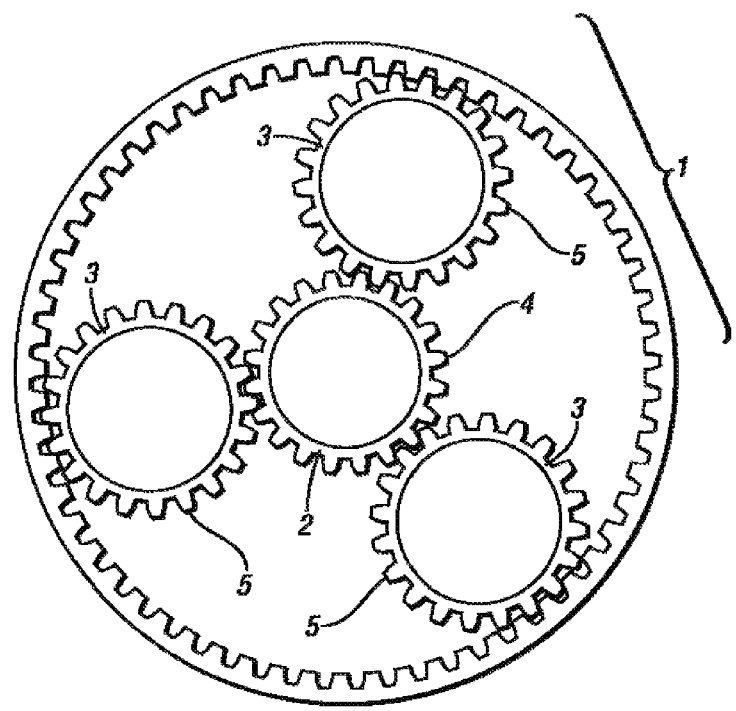
FIG. 1A is a schematic illustration of a representative planetary gear set.

Referring to the drawings, there is shown in FIG. 1A a simple representative planetary gear set 1 consisting of a high-cycle gear element 2 and a plurality of lower-cycle gear elements 3, in which the high-cycle gear teeth 4 are engaged or otherwise meshed with the gear teeth 5 of the lower-cycle gear elements 3. Such a planetary gear set is commonly used, for example, in automotive range or final drive gear sets. The cycle disparity between mating gear elements 2, 3 as depicted in planetary gear set 1 of FIG. 1A results in variance in the damage profile observed at the respective mating surfaces of gear elements 2 and 3. The actual damage profile of the mating gears 2, 3 will depend upon various factors, for example gear ratio, loading, and gear speed, but damage variance would be observed in any gear set in which at least one gear member experiences a disproportionate number of cycles relative to the remaining gear elements of the gear set.

Figure 1B:
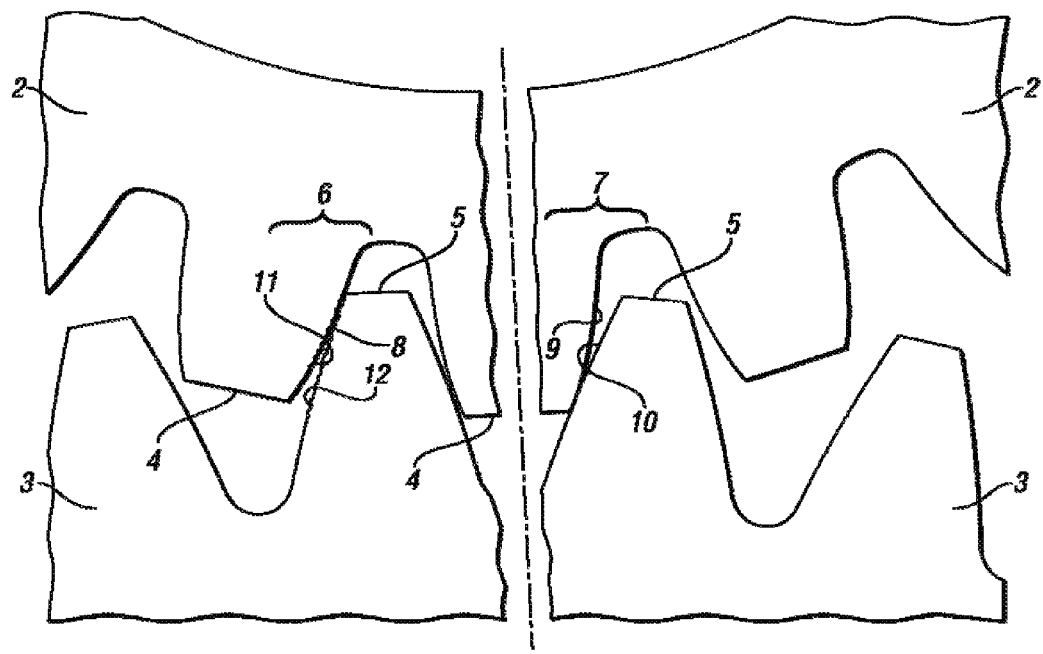
FIG. 1B is a schematic illustration of mating gear teeth with contact surfaces in unfinished condition, shown on the left hand side, and finished condition, shown on the right hand side.

FIG. 1B is a close-up view of an high-cycle gear tooth 4 and lower-cycle gear tooth 5, both having a typical involute profile, in which the surface detail of high cycle gear tooth 4 and gear tooth 5 are shown both in unfinished condition 6 (left-hand side) and finished condition 7 (right-hand side). Under unfinished condition 6, micro-asperities 8, i.e. micro-level surface irregularities producing surface roughness, are present along the mating surfaces 11, 12 of high-cycle gear tooth 4 and gear tooth 5, respectively. The micro-asperities 8 present on the surfaces of high-cycle gear tooth 4 and gear tooth 5 come into direct dynamic contact as gear teeth 4, 5 engage, revolve, and disengage through one complete cycle, resulting in friction and plastic deformation. Consequently, gear teeth 4, 5 experience accumulative damage and potentially, premature failure of high-cycle gear element 2, and as a result, planetary gear set 1. Furthermore, the system experiences loss in the form of friction and resulting heat.

The right half of FIG. 1B depicts gear teeth 4, 5 in finished condition 7 in accordance with this invention. In one aspect of the invention, finished condition 7 is accomplished solely by specifying and/or controlling the hardness differential between mating high cycle gear surface 9 and mating gear surface 10. As used herein, the term "hardness differential" refers to the amount by which the surface hardness of mating hard gear surface 9 exceeds that of mating gear surface 10. The term "hard gear surface" as used herein refers to the surface of the harder of two mating gears, with the term "hard gear" describing a general gear element having a surface hardness exceeding 70 HR-30N. Such hard gears are of the style typically used in high stress, high cycle automotive applications and similar applications.

In the preferred embodiment, the contact surfaces of high-cycle gear tooth 4 are of a surface hardness range of approximately 2.5 to 7 HR-30N above that of gear tooth 5. A hardness differential range of 2.5 to 5 HR-30N is preferred for gears in lubricated contact in systems in which the lubricant has properties similar to those of transmission fluid. Gear element 3, having a relatively lower cycle frequency, is retained at a standard or production-specified hardness. A typical production-specified gear hardness for automotive transmission gear elements is approximately 75 HR-30N, and would therefore preferably engage with a higher-cycle gear 2 having a surface hardness range of approximately 77.5 to 80 HR-30N.

By employing a properly selected hardness differential between mating hard gears according to the terms of the invention, surface damage is balanced between the mating gear surfaces without the undesirable effect of high cycle gear 2 disproportionately wearing or cutting the surface of gear 3. The wear-balancing effect therefore occurs at the micro-level, with resultant changes in respective surface layer plasticity leading to reduced pitting and crack initiation. By reducing crack initiation, the likelihood of crack propagation due to elastic deformation is greatly reduced. Gear set life is thereby greatly extended, resulting in cost savings and improvements in overall system reliability.

In another aspect of the invention, finished condition 7 is further enhanced by the use of surface finishing as applied to the mating surfaces 9, 10 of gears 2, 3 as represented by mating surfaces 9, 10 in FIG. 1B. Examples of surface finishing techniques include electro-polishing, chemical treating, honing or super-finishing, methods that operate at the micronic and sub-micronic levels to produce a more even surface profile.

Figure 2:
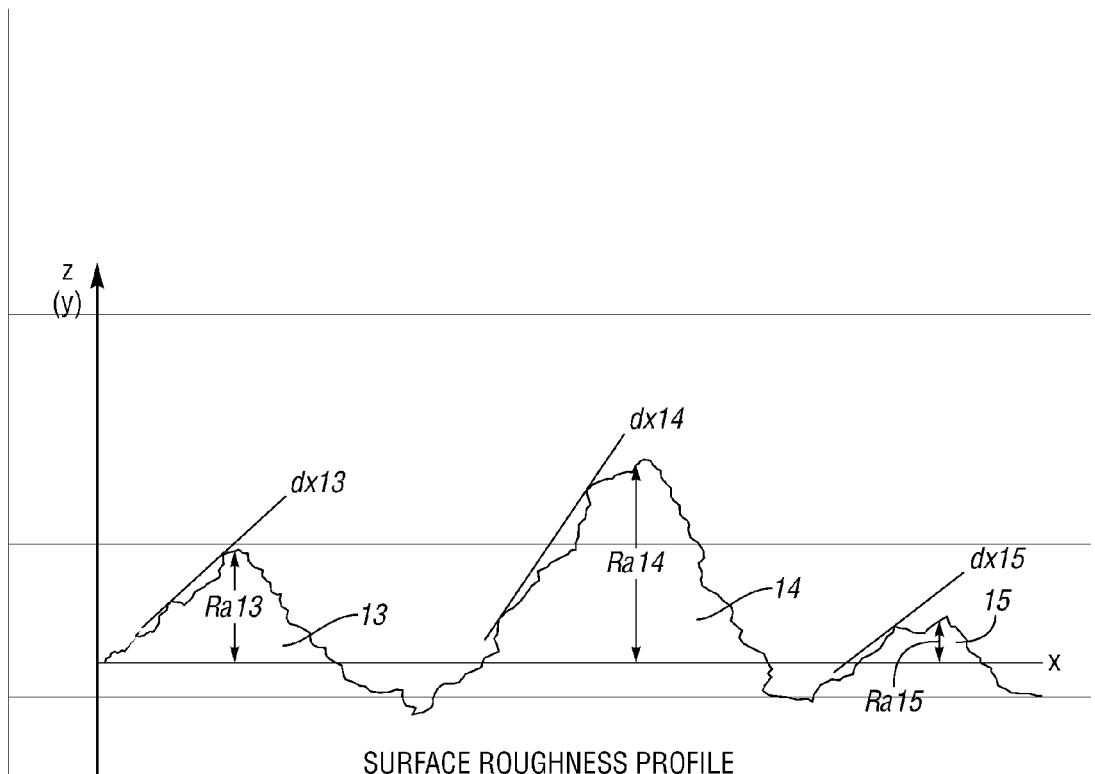
FIG. 2 is a schematic graphical illustration of a surface roughness profile of an unfinished mating gear surface.

With reference to FIG. 2, the quantities Ra, measured in micrometers or microns, and dX, measured in degrees, are known in the metal finishing art, with Ra representing the arithmetic mean height of the asperities in a roughness profile, and dX representing the average absolute value of the slope of the asperities in a roughness profile. Slope dX is a function both of the media type used within a polishing slurry and the resident time the part being finished is subjected to in the polishing process. When taken together with Ra, dX defines the final parameters of a surface finish.

In FIG. 2, a simplified representative surface roughness profile in sliding direction is shown as three discrete asperities 13, 14, and 15, each with a unique height Ra, measured in micrometers, and local slope dX, measured in degrees. In this example, asperity 13 is depicted with a height $Ra_{13}$ and a local slope quantity $dX_{13}$, asperity 14 is depicted with a height $Ra_{14}$ and a local slope quantity $dX_{14}$, and asperity 15 is depicted with a height $Ra_{15}$ and a local slope quantity $dX_{16}$. The overall slope dX is the average slope over the entire range of measurement, i.e. the full length of mating surfaces 11, 12. In the simplified example of FIG. 3, the average slope dX would be the absolute average of slopes $dX_{13, 14, 15}$ of asperities 13, 14, and 15.

An isotropic finish is preferred, i.e. a finish with no discernable pattern at the micro level, as such a finish facilitates unimpeded, even lubricant fluid flow across and around the surfaces of the mating hard gears. An isotropic finish therefore helps to minimize losses due to fluid friction imparted by the lubricant, and thereby enhance the beneficial effects of surface finishing.

Also in the preferred embodiment, the hardness differential between the mating gears is set at a suitable level, preferably a range of 2.5 to 5 HR-30N for common transmission fluids having a viscosity of approximately 35-40 centistokes at 40° C., wherein the softer of the two mating gears is of a hardness of approximately 75 HR-30N. The mating surfaces are then isotropically finished by means of chemical polishing to an Ra of approximately 0.05 microns, which is the preferred Ra for gear sets in lubricated contact with transmission fluid. However, an Ra range of 0.01-1 microns is suitable for most lubricated gear sets. The Ra variable, representing the average asperity height on the gear surface, may be adjusted accordingly for other lubricant fluids depending on the operating conditions and fluid properties. For example, a relatively heavy weight fluid such as gear oil would permit a lesser Ra value due to the thicker protective film and consequent reduction in friction produced by the higher viscosity fluid.

The desired dX range after isotropic chemical polishing is 0.2 to 1 degrees. The desired range produces the best damage profile balancing and life extension results when coupled with a hardness differential range of approximately 2.5 to 5 HR-30N as applied to gear sets in lubricated contact, with transmission fluid as the lubricant.

Figures 3A, 3B:
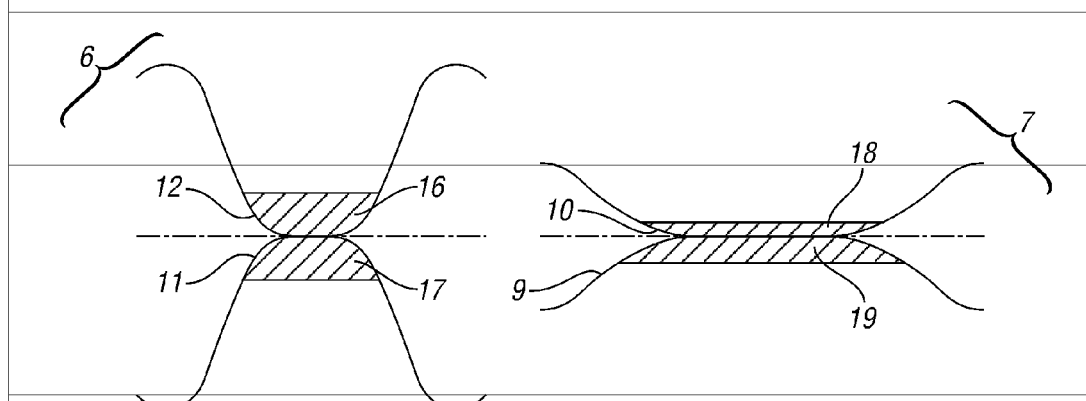
FIG. 3A is a schematic illustration of a representative contact profile for unfinished mating gear surfaces.
FIG. 3B is a schematic illustration of a representative contact profile for mating gear surfaces finished in accordance with this invention.

As shown in FIG. 3, by coupling a properly selected hardness differential with isotropic surface finishing, the damage profile of mating hard gears can be optimized. FIG. 3A shows an unfinished condition 6 representative surface contact profile for mating gear surfaces 11, 12. FIG. 3B shows a finished condition 7 representative surface contact profile for mating gear surfaces 9, 10, according to the present invention. In FIG. 3A, plastically deformed layers 16, 17 are relatively deep, approaching 15 to 20 nm (nanometers) for typical mating automotive transmission hard gears of over 70 HR-30N. Such a deep plastically deformed layers increases the likelihood of crack initiation, pitting, and other damage, damage which is then exacerbated by the effects of elastic deformation.

The present invention further applies isotropic chemical polishing to the mating surfaces 11, 12 to minimize, and preferably eliminate, the plastically deformed layer. In FIG. 3B, plastically deformed layers 18 and 19 are shown with a thickness that is substantially reduced in comparison to plastically deformed layers 16 and 17 of FIG. 3A. This reduction is accomplished by increasing the area of contact between mating surfaces 11, 12 of FIG. 3A to produce the profile approximated by mating surfaces 9, 10 of FIG. 3B. The preferred profile is brought about by the reduction in average slope dX and average height Ra of the micro-asperities 8, as previously disclosed.

While absolute elimination of the plastically deformed layers 18, 19 is the preferred situation, in practice such a result is difficult to achieve. The difficulty of measuring the thickness of plastically deformed layers between mating gear element surfaces greatly increases as the plastically deformed layer thickness approaches zero. A practical thickness of layers 18, 19 would therefore be approximately 1 to 2 nm. Therefore, this invention localizes the plastic deformation remaining after isotropic finishing primarily to the mating surfaces of the lower cycle gear elements 3, thereby balancing accumulative damage due to run-in and subsequent use.

While the best modes for carrying out the invention have been described in detail, those familiar with the art to which this invention relates will recognize various alternative designs and embodiments for practicing the invention within the scope of the appended claims.

The invention claimed is:

1. A gear set comprising at least two rotatably connected hard gear elements having respective mating surfaces each having a hardness of at least 70 on the Rockwell 30N superficial hardness scale (70HR-30N), said mating surfaces including deformable asperities dynamically contactable with each other when said hard gear elements rotate, wherein said at least two hard gear elements are rotatable at different cycle rates and wherein the respective mating surfaces are configured with a sufficient predetermined hardness differential between the respective dynamically contactable asperities, whereby a majority of a residual plastic deformation of said deformable asperities is allocated to said hard gear element having the lower of said cycle rates.

2. The gear set of claim 1, wherein said respective asperities are defined by an average height Ra and slope dX, and wherein said mating surfaces undergo a polishing process to optimize said height and slope prior to assembly of said gear set.

3. The gear set of claim 1, wherein said at least two rotatably connected gear elements are selected from the group consisting of sun gear, pinion gear, and ring gear.

4. The gear set of claim 1, wherein said first surface hardness exceeds said second surface hardness by approximately 0.5 to 5 HR-30N.

5. The gear set of claim 4, wherein an average absolute value of the slope of a roughness profile of said mating surfaces is between approximately 0.2 and 1 degrees.

6. The gear set of claim 5, wherein said mating surfaces are in lubricated contact wherein the lubricant is transmission fluid, and wherein said average absolute value of the slope of the roughness profile is between approximately 0.8 and 0.9 degrees.

7. A gear set comprising at least two rotatably connected hard gear elements rotating at different cycle rates, wherein each of said gear elements has a surface hardness of at least 70 on the Rockwell 30N superficial hardness scale (70HR-30N), wherein said gear elements have respective mating surfaces having a hardness differential of between approximately 2.5 and 7 HR-30N, and a roughness profile having an average height Ra of between approximately 0.01 and 0.1 micrometers and an average slope dX of between approximately 0.8 and 0.9 degrees.

8. The gear set of claim 7, wherein said at least two rotatably connected hard gear elements are selected from the group consisting of sun gear, pinion gear, and ring gear.

9. The gear set of claim 8, wherein each of said mating surfaces are comprised of a plastically deformed layer, with each of said layers not exceeding 2 nanometers in thickness.

* * * * *